US012744618B2

(12) United States Patent
Li

(10) Patent No.: US 12,744,618 B2
(45) Date of Patent: Sep. 22, 2026

(54) PDCCH BLIND DECODING METHOD, APPARATUS, AND DEVICE

(71) Applicant: VIVO MOBILE COMMUNICATION CO., LTD., Dongguan (CN)

(72) Inventor: Na Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 321 days.

(21) Appl. No.: 18/371,691

(22) Filed: Sep. 22, 2023

(65) Prior Publication Data

US 2024/0014926 A1 Jan. 11, 2024

Related U.S. Application Data

(63) Continuation of application No. PCT/CN2022/082493, filed on Mar. 23, 2022.

(30) Foreign Application Priority Data

Mar. 23, 2021 (CN) ........................ 202110310580.4

(51) Int. Cl.

*H04L 1/00* (2006.01)
*H04W 72/1273* (2023.01)
*H04W 72/232* (2023.01)
*H04W 72/566* (2023.01)

(52) U.S. Cl.

CPC ....... *H04L 1/0038* (2013.01); *H04W 72/1273* (2013.01); *H04W 72/232* (2023.01); *H04W 72/566* (2023.01)

(58) Field of Classification Search

CPC ........ H04L 1/0038; H04L 1/00; H04W 24/08; H04W 72/1263; H04W 72/12

See application file for complete search history.

(56) References Cited

U.S. PATENT DOCUMENTS

2019/0313321 A1* 10/2019 Xu ........................ H04W 72/51
2020/0351644 A1 11/2020 Yang et al.
2021/0037558 A1* 2/2021 Xu ...................... H04W 72/535

(Continued)

FOREIGN PATENT DOCUMENTS

CN 110740479 A 1/2020
CN 111093270 A 5/2020

(Continued)

OTHER PUBLICATIONS

CMCC, "Discussion on group scheduling mechanisms", 3GPP TSG RAN WG1 #104-e, e-Meeting, Jan. 25-Feb. 5, 2021, R1-2101063.

(Continued)

*Primary Examiner* — Romani Ohri
(74) *Attorney, Agent, or Firm* — The Webb Law Firm

(57) ABSTRACT

A PDCCH blind decoding method includes obtaining, by a UE, a configuration of a target search space set; and performing, by the UE, PDCCH blind decoding based on the configuration of the target search space set, where the target search space set meets a target condition; the target condition includes that a candidate PDCCH in the target search space set is not decoded when a decoding object corresponding to the candidate PDCCH in at least one transmission time unit exceeds a blind decoding capability of the UE; and the decoding object includes a CCE or a quantity of BD of candidate control channels.

20 Claims, 3 Drawing Sheets

(56) References Cited

U.S. PATENT DOCUMENTS

| | | | | |
|---|---|---|---|---|
| 2021/0144746 | A1 | 5/2021 | Ji | |
| 2021/0250917 | A1* | 8/2021 | Takeda | H04W 72/23 |
| 2022/0201691 | A1 | 6/2022 | Shi et al. | |
| 2022/0264555 | A1* | 8/2022 | Liu | H04W 72/0453 |

FOREIGN PATENT DOCUMENTS

| | | | |
|---|---|---|---|
| EP | 3742634 | A1 | 11/2020 |
| WO | 2020015643 | A1 | 1/2020 |
| WO | 2021016046 | A1 | 1/2021 |

OTHER PUBLICATIONS

Ericsson, "Mechanisms to support MBS group scheduling for RRC_Connected UEs", 3GPP TSG-RAN WG1 Meeting #104-e, eMeeting, Jan. 25-Feb. 5, 2021, R1-2101726.

OPPO, Enchancements on multi-TRP for PDCCH, PUCCH and PUSCH, 3GPP TSG RAN WG1 #104-e, e-Meeting, Jan. 25-Feb. 5, 2021, R1-2100119.

* cited by examiner

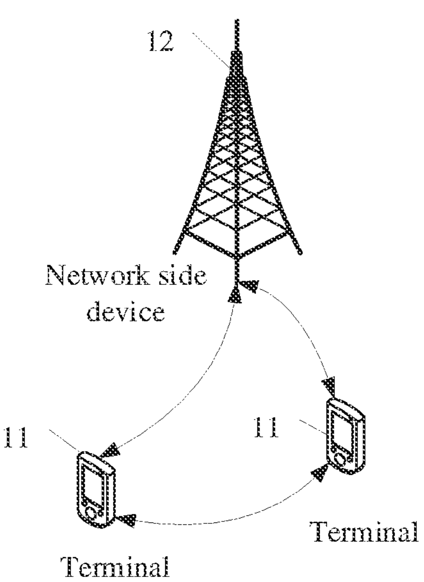
FIG. 1
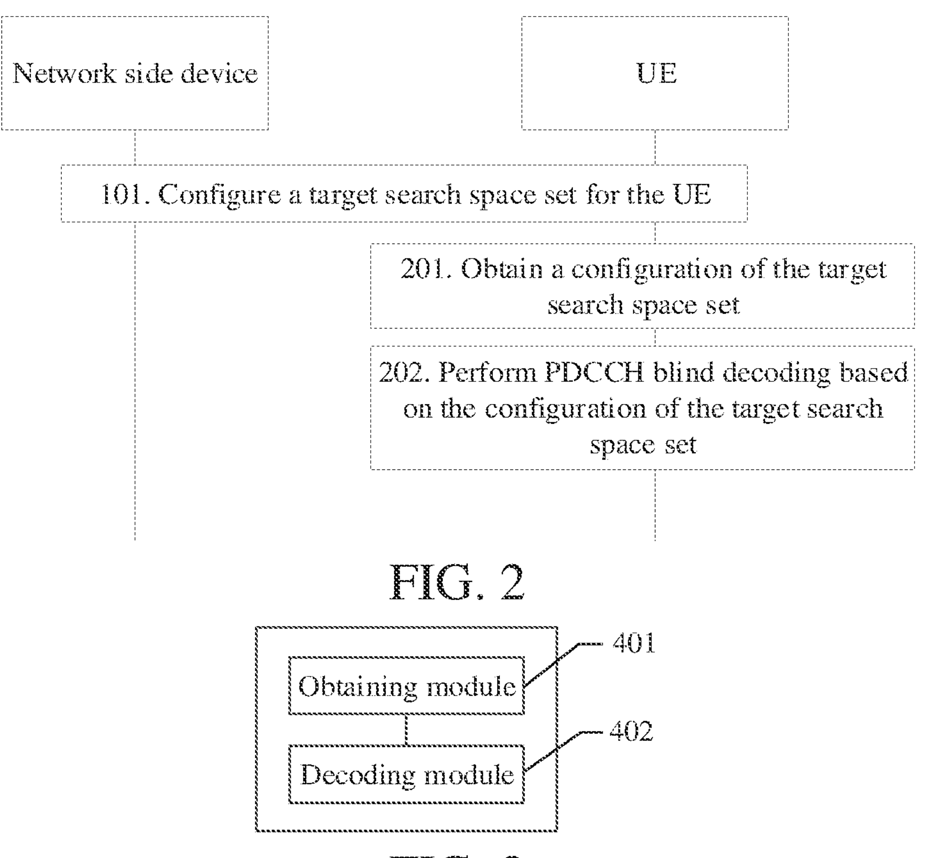
FIG. 2
FIG. 3

PDCCH BLIND DECODING METHOD, APPARATUS, AND DEVICE

CROSS-REFERENCE TO RELATED APPLICATIONS

This application is a Bypass Continuation application of International Patent Application No. PCT/CN2022/082493, filed Mar. 23, 2022, and claims priority to Chinese Patent Application No. 202110310580.4, filed Mar. 23, 2021, the disclosures of which are hereby incorporated by reference in their entireties.

BACKGROUND OF THE INVENTION

Field of the Invention

This application relates to the field of communication technologies, and to a PDCCH blind decoding method, an apparatus, and a device.

Description of Related Art

Currently, a group-common physical downlink shared channel (PDSCH) can be scheduled through a group-common physical downlink control channel (PDCCH). The group-common PDCCH needs to be sent in a common search space (CSS) set.

SUMMARY OF THE INVENTION

Embodiments of this application provide a PDCCH blind decoding method, an apparatus, and a device.

According to a first aspect, a PDCCH blind decoding method is provided. The method includes:

obtaining, by a UE, a configuration of a target search space set; and performing, by the UE, PDCCH blind decoding based on the configuration of the target search space set, where the target search space set meets a target condition; the target condition includes that a candidate PDCCH in the target search space set is not decoded when a decoding object corresponding to the candidate PDCCH in at least one transmission time unit exceeds a blind decoding capability of the UE; and the decoding object includes a CCE or a quantity of BD of candidate control channels.

According to a second aspect, a PDCCH blind decoding method is provided. The method includes:

configuring, by a network side device, a target search space set for a UE, where the target search space set meets a target condition; the target condition includes that a candidate PDCCH in the target search space set is not decoded when a decoding object corresponding to the candidate PDCCH in at least one transmission time unit exceeds a blind decoding capability of the UE; and the decoding object includes a CCE or a quantity of BD of candidate control channels.

According to a third aspect, a PDCCH blind decoding apparatus is provided. The apparatus includes:

an obtaining module, configured to obtain a configuration of a target search space set; and a decoding module, configured to perform PDCCH blind decoding based on the configuration of the target search space set obtained by the obtaining module, where the target search space set meets a target condition; the target condition includes that a candidate PDCCH in the target search space set is not decoded when a decoding object corresponding to the candidate PDCCH in at least one transmission time unit exceeds a blind decoding capability of a UE; and the decoding object includes a CCE or a quantity of BD of candidate control channels.

According to a fourth aspect, a PDCCH blind decoding apparatus is provided. The apparatus includes:

a configuration module, configured to configure a target search space set for a UE, where the target search space set meets a target condition; the target condition includes that a candidate PDCCH in the target search space set is not decoded when a decoding object corresponding to the candidate PDCCH in at least one transmission time unit exceeds a blind decoding capability of the UE; and the decoding object includes a CCE or a quantity of BD of candidate control channels.

According to a fifth aspect, a terminal is provided. The terminal includes a processor, a memory, and a program or instruction stored on the memory and executable on the processor, the program or instruction, when executed by the processor, implementing steps of the method according to the first aspect.

According to a sixth aspect, a terminal is provided. The terminal includes a processor and a communication interface, where the processor is configured to obtain a configuration of a target search space set, and perform PDCCH blind decoding based on the configuration of the target search space set; the target search space set meets a target condition; the target condition includes that a candidate PDCCH in the target search space set is not decoded when a decoding object corresponding to the candidate PDCCH in at least one transmission time unit exceeds a blind decoding capability of a UE; and the decoding object includes a CCE or a quantity of BD of candidate control channels.

According to a seventh aspect, a network side device is provided. The network side device includes a processor, a memory, and a program or instruction stored in the memory and executable on the processor, the program or instruction, when executed by the processor, implementing steps of the method according to the first aspect.

According to an eighth aspect, a network side device is provided. The network side device includes a processor and a communication interface, where the processor is configured to configure a target search space set for a UE; the target search space set meets a target condition; the target condition includes that a candidate PDCCH in the target search space set is not decoded when a decoding object corresponding to the candidate PDCCH in at least one transmission time unit exceeds a blind decoding capability of the UE; and the decoding object includes a CCE or a quantity of BD of candidate control channels.

According to a ninth aspect, a non-transitory readable storage medium is provided. The non-transitory readable storage medium, storing a program or instruction, the program or instruction, when executed by a processor, implementing steps of the method according to the first aspect, or steps of the method according to the third aspect.

According to a tenth aspect, a chip is provided. The chip includes a processor and a communication interface, where the communication interface is coupled to the processor, and the processor is configured to run a program or instruction to implement the method according to the first aspect, or the method according to the second aspect.

According to an eleventh aspect, a computer program/program product is provided. The computer program/program product is stored in a non-volatile storage medium, and the computer program/program product is executed by at least one processor to implement the method according to the first aspect, or steps of the method according to the second aspect.

BRIEF DESCRIPTION OF THE DRAWINGS

FIG. 1 is a system architecture diagram of a communication system according to an embodiment of this application;

FIG. 2 is a method flowchart of a PDCCH blind decoding method according to an embodiment of this application;

FIG. 3 is a schematic structural diagram 1 of a PDCCH blind decoding apparatus according to an embodiment of this application;

FIG. 4 is a schematic structural diagram 2 of a PDCCH blind decoding apparatus according to an embodiment of this application;

FIG. 5 is a schematic structural diagram of a communication device according to an embodiment of this application;

DESCRIPTION OF THE INVENTION

Figure 6:
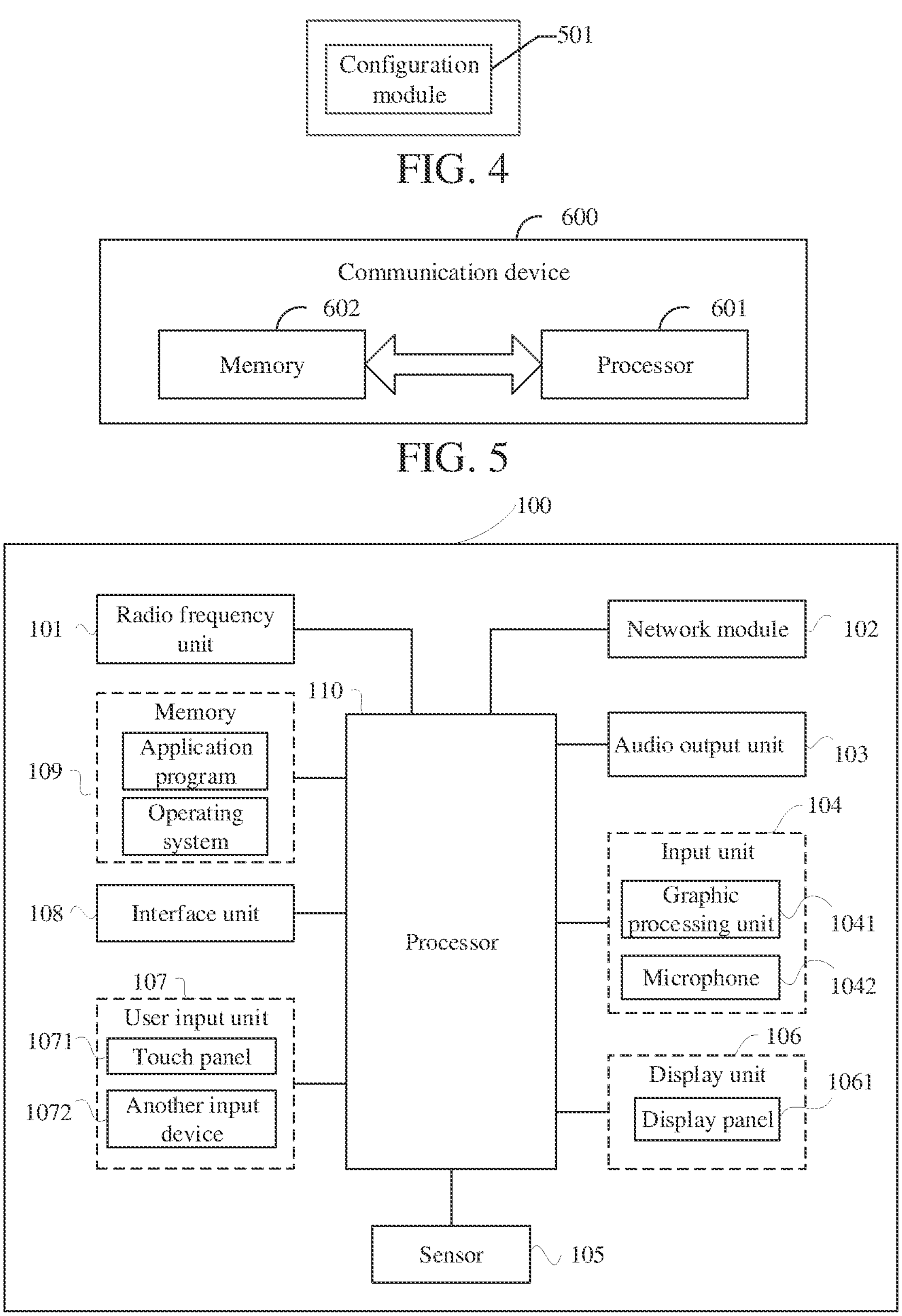
FIG. 6 is a schematic structural diagram of hardware of a terminal according to an embodiment of this application.

The following clearly describes the technical solutions in embodiments of this application with reference to the accompanying drawings in the embodiments of this application. Apparently, the described embodiments are merely some of the embodiments of this application rather than all of the embodiments. All other embodiments obtained by a person of ordinary skill in the art based on embodiments of this application shall fall within the protection scope of this application.

The specification and claims of this application, and terms "first" and "second" are used to distinguish similar objects, but are not used to describe a specific sequence or order. It may be understood that the terms used in such a way are interchangeable in proper circumstances, so that the embodiments of this application can be implemented in other sequences than the sequence illustrated or described herein. In addition, the objects distinguished by "first" and "second" are usually of a same class, without limiting a quantity of objects. For example, a first object can be one or more. In addition, "and/or" in this specification and the claims indicates at least one of the connected objects, and the character "/" generally indicates that the associated objects are in an "or" relationship.

1) Search Space Set (SS Set) and SS Set Type

A PDCCH carries downlink control information (DCI). In LTE, the PDCCH occupies the entire bandwidth in the frequency domain, and occupies the first 1-3 symbols of each subframe in the time domain, and is dynamically scheduled based on the amount of resources. In NR, if the PDCCH continues to occupy the entire bandwidth using the LTE method, it is undoubtedly a waste of resources, and it will put high requirements on a UE, which is not conducive to reducing the cost of the UE. Therefore, the PDCCH in NR will be in BWP, and does not occupy fixed slots in the time domain.

Generally, SS is a time domain resource location of PDCCH, while CORESET is a frequency domain resource location of PDCCH. One or more SSs form one SS set, and each SS set is associated with one CORESET ID. One CORESET may be associated with a plurality of SS sets.

There are many types of SS sets, first divided into a common search space (CSS) set and a UE-specific search space (USS) set. The types are as follows:

- Type0-PDCCH CSS set: for the reception of a system information block (SIB) 1;
- Type0A-PDCCH CSS set: for the reception of Other SIB;
- Type1-PDCCH CSS set: scheduling of msg2 and msg4 of RA;
- Type2-PDCCH CSS set: for paging;
- Type3-PDCCH CSS set: There are many purposes, such as INT-RNTI, SFI-RNTI, TPC-PUSCH-RNTI, TPC-PUCCH-RNTI, TPC-SRS-RNTI, CI-RNTI, PS-RNTI, and different scrambling codes correspond to different functions;
- USS set: for the reception of UE Specific PDCCH.

Different types of search spaces will have PDCCHs scrambled by different RNTIs, corresponding to the foregoing different purposes. From the above description, it can be seen that the CSS is a common search space of a cell, shared by all users in the cell, and is mostly used for information that needs to be broadcast. When the UE monitors the search space, the CSS takes precedence over the USS. In addition, the USS set and a CCE index are UE specific, that is, for USS sets of different UEs, CCE indexes of the USS sets are UE specific, while the CSS set and the CCE index are group-common, that is, for one CSS set, the CCE indexes determined by different UEs are the same.

2) Determination of SS

Generally, the determination of search space is mainly divided into two steps.

Step 1. A CCE index of each candidate PDCCH in CORESET in a configured candidate PDCCH set is determined based on configuration information in a search space set.

Step 2. Determine a candidate PDCCH set to be decoded based on a preset rule in the configured candidate PDCCH set. The candidate PDCCH set to be decoded is a subset of the configured candidate PDCCH set.

For example, a CCE index of each candidate PDCCH in CORESET in NR is determined based on a given search space function. The search space function follows a function used in LTE to determine EPDCCH. In this way, the candidate PDCCHs are distributed on the CCE set in the CORESET at an equal interval.

Optionally, for a search space set s associated with the CORSET in a slot, the CCE index of the candidate PDCCH with an aggregation level L is given by:

$$L\cdot\left\{\left(Y_{p,n_{s,f}^{\mu}}+\left\lfloor\frac{m_{s,n_{CI}}\cdot N_{CCE,p}}{L\cdot M_{p,s,max}^{(L)}}\right\rfloor+n_{CI}\right)\bmod\lfloor N_{CCE,p}/L\rfloor\right\}+I,\quad i=0,\ldots,L-1;$$

for a common search space, $$Y_{p,n_{s,f}^{\mu}}=0;$$

and for a UE-specific search space, $$Y_{p,n^{\mu}_{s,f}} = \left(A_p \cdot Y_{p,n^{\mu}_{s,f}-1}\right) \bmod D,$$

$Y_{p,-1}=n_{RNTI}\neq 0$, D=65537; when p mod 3=0, $A_0$=39827; When p mod 3=1, $A_1$=39827; when p mod 3=2, $A_0$=39827; $N_{CCE,p}$ is a total number of CCEs included in CORESET p, and the CCEs are numbered from 0 to $N_{CCE,p}-1$.

3) BD/CCE Blind Decoding Capability

A PDCCH can support various downlink control information formats and aggregation level sizes, but such information cannot be obtained in advance for a UE, so the UE needs to perform blind decoding on the PDCCH. In NR, a maximum of 10 search space sets can be configured for each downlink BWP within a service cell. In addition, search space time domain configuration information is added in NR. The UE needs to decode a candidate PDCCH based on a position of the configured search space set in the time domain.

For determining a subset to be decoded within the configured candidate PDCCH set, it is necessary to define an upper limit of a blind decoding capability of the UE. The blind decoding capability includes a quantity of BD and a quantity of non-overlapping CCEs of candidate control channels decoded in each slot and/or each span (consecutive symbols within a slot). As shown in table 1 below, the table 1 characterizes a relationship between the blind decoding capability of the UE and subcarrier spacing in each slot in the service cell.

TABLE 1

| Subcarrier spacing (kHz) | Maximum quantity of candidate control channels per slot | Maximum quantity of non-overlapping CCEs per slot |
|---|---|---|
| 15 | 44 | 56 |
| 30 | 36 | 56 |
| 60 | 22 | 48 |
| 120 | 20 | 32 |

In addition, in the NR Rel-16 version, the blind decoding capability can also be defined as the blind decoding capability of the UE within each span. Span is defined as several consecutive OFDM symbols in one slot.

The maximum quantity of candidate control channels limits the complexity of blind decoding by the UE, while the quantity of non-overlapping CCEs limits the complexity of channel estimation by the UE. Therefore, when the BD/CCEs of all configured search spaces in a certain slot exceeds the capability of the UE (i.e., BD/CCE overbooking), the search space to be decoded is determined based on a certain rule, while the remaining search spaces do not need to be decoded.

4) Group-Common PDSCH

Currently, an NR technology has experienced the evolution of two versions of Rel-15 and Rel-16. In the two versions, broadcast/multicast features have not been supported. However, broadcast/multicast features in many important usage scenarios, such as public safety and mission critical, V2X applications, transparent IPv4/IPv6 multicast delivery, IPTV, software delivery over wireless, group communications and IoT applications, and the like, can provide substantial improvements, especially in terms of system efficiency and user experience. Therefore, in a next release of Rel-17, NR will introduce broadcast/multicast features. A broadcast/multicast service is mainly transmitted through a group-common PDSCH. The UE can receive both the group-common PDSCH and a unicast PDSCH simultaneously. The group-common PDSCH can be scheduled through a group-common PDCCH, and a determination method of a CCE index of an SS where the group-common PDCCH is located is group-common.

It should be noted that the technologies described in embodiments of this application are not limited to the long term evolution (LTE)/LTE-advanced (LTE-A) system, and may further be applied to other wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" in embodiments of this application are often used interchangeably. The technologies described in the embodiments of this application can be applied to the systems and radio technologies mentioned above, and can also be applied to other systems and radio technologies. The following descriptions describe a new radio (NR) system for an example purpose, and uses the NR terminology in most of the following descriptions, but these technologies can also be applied to applications other than NR system applications, such as a 6th Generation (6G) communication system.

FIG. 1 shows an architecture diagram of a wireless communication system that can be applied in embodiments of this application. The wireless communication system includes a terminal 11 and a network side device 12. The terminal 11 may also be referred to as a terminal device or user equipment (UE). The terminal 11 may be a terminal side device, such as a mobile phone, a tablet computer, a laptop computer or referred to as a notebook computer, a personal digital assistant (PDA), a handheld computer, a netbook, a ultra-mobile personal computer (UMPC), a mobile Internet device (MID), a wearable device or vehicle user equipment (VUE), a pedestrian user equipment (PUE), or the like. The wearable device includes a smart watch, a bracelet, a headset, glasses, and the like. It should be noted that the specific type of the terminal 11 is not limited in the embodiments of this application. The network side device 12 may be a base station or core network. The base station may be referred to as a term such as a NodeB, an evolved NodeB, an access point, a base transceiver station (BTS), a radio base station, a radio transceiver, a basic service set (BSS), an extended service set (ESS), a B-node, an evolved B-node (eNB), a home B-node, a home evolved B-node, a WLAN access point, a WiFi node, a transmitting receiving point (TRP), or some other suitable term in the field. The base station is not limited to a specific technical vocabulary as long as a same technical effect is achieved. It should be noted that the base station in the NR system is only used as an example, but the specific type of the base station is not limited in the embodiments of this application.

In related technologies, a quantity of blind decoding (BD)/non-overlapping control channel elements (CCE) of the CSS set in each slot cannot exceed a blind decoding capability of a UE (the blind decoding capability includes the quantity of BD of candidate control channels and the quantity of non-overlapping CCEs decoded in each slot). Therefore, the UE cannot configure too many CSS sets for transmitting the group-common PDCCH. In addition, when the BD/CCE of all search spaces (including the CSS set and a UE-specific search space (USS) set configured in a certain slot exceeds the blind decoding capability of the UE, the UE will first decode the CSS set and USS sets with small indexes, but USS sets with large indexes are not decoded). That is, a configuration limitation and a blind decoding priority of a current SS set do not meet a scheduling requirement of an actual multicast/multicast service (for example, the UE may have a plurality of multicast/broadcast services, or a priority of a multicast/broadcast service is lower than that of a unicast service).

The following describes a PDCCH blind decoding method provided in embodiments of this application through some embodiments and application scenarios thereof with reference to the accompanying drawings.

FIG. 2 shows a schematic flowchart of a PDCCH blind decoding method according to an embodiment of this application. As shown in FIG. 2, the PDCCH blind decoding method may include the following steps.

Step 101. A network side device configures a target search space set for a UE.

In embodiments of this application, the target search space set meets a target condition. The target condition includes that a candidate PDCCH in the target search space set is not decoded when a decoding object corresponding to the candidate PDCCH in at least one transmission time unit (for example, a slot or span) exceeds a blind decoding capability of the UE.

In embodiments of this application, the decoding object includes a CCE or a quantity of BD of candidate control channels.

It can be understood that when a quantity of CCEs or a quantity of BD corresponding to a candidate PDCCH within a certain transmission time unit exceeds the blind decoding capability of the UE, it is determined not to decode the candidate PDCCH in the target search space set based on a certain rule. That is, during CCE or BD overbooking, the candidate PDCCH in the target search space set may not be decoded, or the search space set of the candidate PDCCH (i.e., the target search space set) may not be decoded. In other words, the foregoing target search space set allows for CCE or BD overbooking.

For example, in a certain transmission time unit, the UE is configured with one or more CSS sets (for example, it can include at least one of the following: a Type0A-PDCCH CSS set, a Type1-PDCCH CSS set, a Type2-PDCCH CSS set, and a Type3-PDCCH CSS set), a target search space, and one USS set. When the BD/CCEs of all configured SS sets within the transmission time unit exceeds the blind decoding capability of the UE, the UE does not decode a PDCCH in the USS set (assuming that a decoding priority of the target search space set is higher than that of the USS set). If the BD/CCEs corresponding to other SS sets within the slot, other than the USS set, does not exceed the blind decoding capability of the UE, the UE decodes the PDCCH in the target search space set within the transmission time unit. Otherwise, if the blind decoding capability of the UE is exceeded, the PDCCH in the target search space set is not decoded.

Optionally, in embodiments of this application, the network side device needs to configure its SS set type when configuring each SS set for the UE. In NR, there are only two SS set types, namely a CSS set or a USS set. The configuration parameters are as follows: The CSS set cannot be overbooked, and the USS set can be overbooked. In addition, during overbooking, the UE may not decode a PDCCH in an SS set with a larger ID based on an ID size of the USS set.

Therefore, in order to effectively schedule multicast PDCCHs for group-common PDSCHs that transmit multicast/broadcast services, embodiments of this application define a new SS set (i.e., the target search space set in this application, such as an MBS CSS set or a Type4-PDCCH CSS set, with no specific name restrictions). The target search space set can meet at least one of the following:

1) A CCE index of the target search space set is group-common. For example, a parameter $$Y_{p,n^{\mu}_{s,f}}=0$$

or $n_{g\text{-}RNTI}$ when a CCE index of a PDCCH in CORESET is determined.

2) When a candidate PDCCH configured in a certain slot/span exceeds a BD/CCE capability of a UE, the UE may determine not to decode the candidate PDCCH within the SS set based on a certain principle.

3) A priority of the target search space set (i.e., a sequence in which the SS set is not decoded relative to other SS sets during BD/CCE overbooking) may be configured.

Optionally, in embodiments of this application, the foregoing target search space set may be either a common search space set or a UE-specific search space set.

Optionally, in embodiments of this application, in a case that the foregoing target search space set is a common search space set, the step 101 may be configured by the following step 101*a* or 101*b*.

Step 101*a*. The network side device configures a target parameter for the common search space set through a high-level parameter.

The common search space set configured with the target parameter meets the target condition.

It can be understood that a CSS set configured with the target parameter may be considered as different from traditional CSS sets. The CSS set may allow CCE or BD overbooking, and the UE may not decode a PDCCH within this type of CSS set during BD/CCE overbooking.

For example, the foregoing target parameter may be a specific parameter or label. This is not limited in embodiments of this application.

Step 101*b*. The network side device configures the common search space set through a target information element IE.

The configured common search space set meets the target condition.

It can be understood that, embodiments of this application introduce a new IE configuration CSS set. A CSS set configured by the IE may enable BD/CCE overbooking, and the UE may not decode a PDCCH within this type of CSS set during BD/CCE overbooking.

In related technologies, for a CSS set, the CSS set may be divided into different CSS set types by configuring an RRC parameter of the CSS set. Similarly, in embodiments of this application, the network side device may configure a CSS set through a specific IE, making the CSS set different from the CSS set mentioned in the relevant technologies mentioned above. For example, by introducing a parameter MBSSearchspace in PDCCH-config to configure one CSS set, a CSS set configured in this way (for example, defined as a type 4-PDCCH CSS set) can only be used for scheduling a group-common PDSCH and can enable BD/CCE overbooking. In addition, during BD/CCE overbooking, the UE may not decode the candidate PDCCH in its CSS set.

Optionally, in embodiments of this application, in a case that the target search space set is a common search space set, and when the CSS set is only associated with a target DCI format or target RNTI, this type of CSS set may enable BD/CCE overbooking, and the UE may not decode a PDCCH within this type of CSS set during BD/CCE overbooking. For example, the foregoing target DCI format is for scheduling a DCI format of a group-common PDSCH. Alternatively, the foregoing target RNTI meets at least one of the following: an RNTI used by the group-common PDSCH, and an RNTI used by a group-common PDCCH for scheduling the group-common PDSCH.

It should be noted that the foregoing target DCI format may be one or more, but these DCI formats are only used for scheduling the group-common PDSCH and not for other scheduling purposes. Similarly, the foregoing target RNTI may be one or more, but these RNTIs are only used for scheduling the group-common PDSCH and not for other scheduling purposes.

In related technologies, when configuring the CSS set or the USS set, the network side device will configure a DCI format that needs to be decoded within its SS set. For example, the CSS set may be configured with a DCI format: 0_0/1_0/2_0/2_1/2_2/2_3, and the like. The USS set may be configured with a DCI format: 0_0/1_0/1_1/1_2/0_2/1_2, and the like. Based on this, assuming that the group-common PDSCH is scheduled through a DCI format X (it should be noted that the DCI format X is not used for other scheduling), embodiments of this application may define: When one CSS set is only configured with the DCI format X, it indicates that the CSS set is only used for the scheduling of the group-common PDSCH, that is, this type of CSS set may be configured in a certain transmission time unit that may enable BD/CCE overbooking. In addition, during BD/CCE overbooking, choose not to decode a candidate PDCCH within the CSS set based on a certain principle.

Similarly, the network side device may also define a CSS set by configuring an RNTI associated with the CSS set. For example, when a CSS set is only associated with a specific RNTI, the foregoing CSS set may be overbooked, or the UE does not decode a candidate PDCCH within the CSS set.

With reference to the schematic flowchart of a PDCCH blind decoding method according to an embodiment of this application shown in FIG. 2, the PDCCH blind decoding method may include the following steps.

Step 201. A UE obtains a configuration of a target search space set.

Step 202. The UE performs PDCCH blind decoding based on the configuration of the target search space set.

In embodiments of this application, the foregoing target search space set refers to configuration information of a target search space set, which characterizes the target search space set.

In embodiments of this application, the target search space set meets a target condition. The target condition includes that a candidate PDCCH in the target search space set is not decoded when a decoding object (i.e., a CCE or BD) corresponding to the candidate PDCCH in at least one transmission time unit exceeds a blind decoding capability of the UE.

Optionally, in embodiments of this application, the target condition further includes that a CCE index corresponding to the target search space set is group-common.

Optionally, in embodiments of this application, in a case that the foregoing target search space set is a common search space set, the common search space set meets at least one of the following:

the common search space set is configured with a target parameter; and the common search space set is configured by a network side device through a target IE.

Optionally, in embodiments of this application, in a case that the common search space set is only associated with a target DCI format and/or a target RNTI, the common search space set meets the target condition.

Optionally, in embodiments of this application, the foregoing target DCI format is for scheduling a DCI format of a group-common PDSCH. Alternatively, the foregoing target RNTI meets at least one of the following: an RNTI used by the group-common PDSCH, and an RNTI used by a group-common PDCCH for scheduling the group-common PDSCH.

Optionally, in embodiments of this application, the step 202 may include the following step 202*a*.

Step 202*a*. The UE determines whether to decode the candidate PDCCH in the target search space set based on target priority information of the target search space set.

The target priority information is used to characterize a sequence in which the target search space set is not decoded relative to other search space sets. It should be noted that the target priority information is further used to characterize a sequence in which the target search space set is decoded relative to other search space sets. This is not limited in embodiments of this application.

In embodiments of this application, the target priority information is determined based on priority configuration information or set identification information of the target search space set and a predetermined rule when the decoding object corresponding to the candidate PDCCH in the at least one transmission time unit exceeds the blind decoding capability of UE (i.e., during CCE/BD overbooking).

Optionally, in embodiments of this application, the set identification information includes a set identification value of the target search space set. The predetermined rule includes at least one of the following:

prioritizing skipping decoding a candidate PDCCH in a search space set with a large set identification value; and prioritizing skipping decoding a candidate PDCCH in a search space set with a set priority lower than that of the target search space set.

For example, embodiments of this application may configure a decoding priority of the target search space set. For example, an index value (which can be different from the set identification value ID of the target search space set) can be configured for the target search space set. A priority of an SS set with a set identification value greater than or equal to the index value can be set to be lower than a priority of the SS set. Conversely, a priority of an SS set with a set identification value smaller than the index value is higher than that of the SS set. Generally, prioritize skipping decoding a candidate PDCCH in a search space set with a set priority lower than that of the target search space set. It can be understood that the index value may be, for a common search space set, an identification value configured for the common search space set to characterize its decoding priority.

Generally, the higher the configured priority, the more it indicates that the UE needs to decode, while the lower the priority, it indicates that the UE does not need to decode. Of course, in practical applications, settings may be made based on actual requirements. This is not limited in embodiments of this application.

For example, in the scenario of BD/CCE overbooking, when determining whether to decode the candidate PDCCH in the target search space set, the ID value size of the SS set or the priority configuration information configured for the SS set can be used to determine the sequence in which the SS set is not decoded relative to other SS sets during BD/CCE overbooking.

For example, the UE may prioritize skipping decoding a candidate PDCCH within an SS with a large ID based on the ID of the SS set (whether it is a USS or a CSS).

For example, a certain slot network side device is configured with three type 3-PDCCH CSS sets (with IDs of ID 0, ID 1, and ID 2 respectively), two target search space sets (with SS set IDs of ID 4 and ID 5 respectively), and two USS sets (with SS set IDs of ID 3 and ID 6 respectively). If the BD/CCE of the target search space set and the USS set exceeds the blind decoding capability of the UE in the slot type 3-PDCCH CSS set, the UE prioritizes skipping decoding a PDCCH within a USS set 6 (i.e., a USS set corresponding to ID 6). If the BD/CCE of the remaining SS sets, other than the USS set 6, still exceeds the BD/CCE capability of the UE, the UE will not decode a target search space set with ID 5. If the blind decoding capability of the UE is not exceeded, the UE will blindly decode PDCCHs in the remaining SS sets. If the BD/CCE of the remaining SS sets, other than the USS set 6 and the target search space set with ID 5, still exceeds the BD/CCE capability of the UE, the UE will not decode a target search space set with ID 4. If the blind decoding capability of the UE is not exceeded, the UE will blindly decode PDCCHs in the remaining SS sets. By analogy, the UE determines the undecoded SS set based on the ID size of the SS set (which only includes the target search space set and USS set), and prioritizes skipping decoding a SS set with a large ID.

For example, take a CSS set as an example. The network side device configures or indicates the priority of the CSS (for example, a priority relative to the USS). For example, if the base station indicates that the priority of the CSS set is greater than that of a USS set X, it indicates that the UE prioritizes skipping decoding a USS with an ID greater than X and X. In this case, if the quantity of BD/CCEs still exceeds the blind decoding capability of the UE, the UE does not decode the candidate PDCCH within the CSS set. Then, if the quantity of BD/CCEs still exceeds the blind decoding capability of the UE, the UE does not decode a candidate PDCCH within a USS set with an ID smaller than X, until the blind decoding capability of the UE is met.

In the PDCCH blind decoding method provided in embodiments of this application, the network side device configures a target search space set that can be overbooked for the UE (i.e., the candidate PDCCH in the target search space set is not decoded when the decoding object corresponding to the candidate PDCCH in the at least one transmission time unit exceeds the blind decoding capability of the UE), to enable the UE to perform blind decoding based on the configuration of the target search space set, thereby meeting a service requirement of an actual system, and improving effectiveness of a communication system.

It should be noted that the PDCCH blind decoding method provided in embodiments of this application can be executed by a PDCCH blind decoding apparatus, or by a control module used to perform the PDCCH blind decoding method in the PDCCH blind decoding apparatus. In embodiments of this application, a case in which the PDCCH blind decoding apparatus performs the PDCCH blind decoding method is used as an example, to illustrate an apparatus of the PDCCH blind decoding method provided in embodiments of this application.

Embodiments of this application provide a PDCCH blind decoding apparatus, as shown in FIG. 3. The PDCCH blind decoding apparatus includes an obtaining module 401 and a decoding module 402, where the obtaining module 401 is configured to obtain a configuration of a target search space set; and the decoding module 402 is configured to perform PDCCH blind decoding based on the configuration of the target search space obtained by the obtaining module 401; the target search space set meets a target condition; the target condition includes that a candidate PDCCH in the target search space set is not decoded when a decoding object corresponding to the candidate PDCCH in at least one transmission time unit exceeds a blind decoding capability of a UE; and the decoding object includes a CCE or a quantity of BD of candidate control channels.

Optionally, in embodiments of this application, the target condition further includes that a CCE index corresponding to the target search space set is group-common.

Optionally, in embodiments of this application, the target search space set is a common search space set.

Optionally, in embodiments of this application, the common search space set meets at least one of the following:

the common search space set is configured with a target parameter; and the common search space set is configured by a network side device through a target IE.

Optionally, in embodiments of this application, in a case that the common search space set is only associated with a target DCI format and/or a target RNTI, the common search space set meets the target condition.

Optionally, in embodiments of this application, the foregoing target DCI format is for scheduling a DCI format of a group-common PDSCH. Alternatively, the foregoing target RNTI meets at least one of the following: an RNTI used by the group-common PDSCH, and an RNTI used by a group-common PDCCH for scheduling the group-common PDSCH.

Optionally, in embodiments of this application, the foregoing decoding module 402 is configured to:

determine whether to decode a candidate PDCCH in a target search space set based on target priority information of the target search space set; the target priority information is for indicating a sequence in which the target search space set is not decoded relative to other search space sets; the target priority information is determined based on priority configuration information or set identification information of the target search space set and a predetermined rule when the decoding object corresponding to the candidate PDCCH in the at least one transmission time unit exceeds the blind decoding capability of the UE.

Optionally, in embodiments of this application, the set identification information includes a set identification value of the target search space set. The predetermined rule includes at least one of the following:

prioritizing skipping decoding a candidate PDCCH in a search space set with a large set identification value; and prioritizing skipping decoding a candidate PDCCH in a search space set with a set priority lower than that of the target search space set.

In the PDCCH blind decoding apparatus provided in embodiments of this application, perform blind decoding based on a configuration of a target search space set that may enable BD/CCE overbooking and that is configured by the network side device for the UE (i.e., the candidate PDCCH in the target search space set is not decoded when the decoding object corresponding to the candidate PDCCH in the at least one transmission time unit exceeds the blind decoding capability of the UE), to meet a service requirement of an actual system, and improve effectiveness of a communication system.

Embodiments of this application provide a PDCCH blind decoding apparatus, as shown in FIG. 4. The PDCCH blind decoding apparatus includes a configuration module 501, where the configuration module 501 is configured to configure a target search space set for a UE; the target search space set meets a target condition; the target condition includes that a candidate PDCCH in the target search space set is not decoded when a decoding object corresponding to the candidate PDCCH in at least one transmission time unit exceeds a blind decoding capability of the UE; and the decoding object includes a CCE or a quantity of BD of candidate control channels.

Optionally, in embodiments of this application, the target search space set is a common search space set.

Optionally, in embodiments of this application, the foregoing configuration module 501 is configured to:

configure a target parameter for the common search space set through a high-level parameter, wherein the common search space set configured with the target parameter meets the target condition.

Optionally, in embodiments of this application, the foregoing configuration module 501 is configured to:

configure the common search space set through a target IE, wherein the configured common search space set meets the target condition.

In the PDCCH blind decoding apparatus provided in embodiments of this application, configure a target search space set that may enable BD/CCE overbooking for the UE (i.e., the candidate PDCCH in the target search space set is not decoded when the decoding object corresponding to the candidate PDCCH in the at least one transmission time unit exceeds the blind decoding capability of the UE), to enable the UE to perform blind decoding based on the configuration of the target search space set, thereby meeting a service requirement of an actual system, and improving effectiveness of a communication system.

The PDCCH blind decoding apparatus in embodiments of this application may be an apparatus, an apparatus or electronic device with an operating system, or a component, integrated circuit, or chip in the terminal. The apparatus or electronic device may be a mobile terminal, or a non-mobile terminal. For example, the mobile terminal may include, but is not limited to, the types of the terminal 11 listed above. The non-mobile terminal may be a server, a network attached storage (NAS), a personal computer (PC), a television (TV), an automatic teller machine or a self-service machine, and the like. Embodiments of this application are not specifically limited.

The PDCCH blind decoding apparatus provided in embodiments of this application may implement the processes implemented by the method embodiments of FIG. 2, and achieve a same technical effect. To avoid repetition, details are not described herein again.

Optionally, as shown in FIG. 5, embodiments of this application further provide a communication device 600, including a processor 601, a memory 602 and a program or instruction stored in the memory 602 and executable on the processor 601. For example, when the communication device 600 is a terminal, the program or instruction, when executed by the processor 601, implements the processes of the PDCCH blind decoding method embodiments, and achieves a same technical effect. When the communication device 600 is a network side device, the program or instruction, when executable by the processor 601, implements the processes of the PDCCH blind decoding method embodiments, and achieves a same technical effect. To avoid repetition, details are not described herein again.

Embodiments of this application further provide a terminal. The terminal includes a processor and a communication interface, where the processor is configured to obtain a configuration of a target search space set, and perform PDCCH blind decoding based on the configuration of the target search space set; the target search space set meets a target condition; the target condition includes that a candidate PDCCH in the target search space set is not decoded when a decoding object corresponding to the candidate PDCCH in at least one transmission time unit exceeds a blind decoding capability of a UE; and the decoding object includes a CCE or a quantity of BD of candidate control channels. The terminal embodiment corresponds to the foregoing terminal side method embodiment, and the implementation processes and methods of the foregoing method embodiment may be applied to the terminal embodiment, and may achieve a same technical effect. Optionally, FIG. 6 is a schematic structural diagram of hardware of a terminal according to an embodiment of this application.

The terminal 100 includes, but is not limited to, at least a part of components such as a radio frequency unit 101, a network module 102, an audio output unit 103, an input unit 104, a sensor 105, a display unit 106, a user input unit 107, an interface unit 108, a memory 109, and a processor 110.

A person skilled in the art may understand that the terminal 100 may further include a power supply (such as a battery) for supplying power to the components. The power supply may be logically connected to the processor 110 by a power management system, thereby implementing functions such as charging, discharging, and power consumption management by using the power management system. A terminal structure shown in FIG. 6 does not constitute a limitation on the terminal, and the terminal may include more or fewer components than shown, or combine some components, or have different component arrangements. Details are not described herein again.

It should be understood that, in embodiments of this application, the input unit 104 may include a graphic processing unit (GPU) 1041 and a microphone 1042, and the graphic processing unit 1041 processes static pictures or video image data obtained by an image capturing apparatus (such as a camera) in a video capturing mode or an image capturing mode. The display unit 106 may include a display panel 1061. The display panel 1061 may be configured in a form of a liquid crystal display, an organic light-emitting diode, or the like. The user input unit 107 includes a touch panel 1071 and another input device 1072. The touch panel 1071 is also referred to as a touch screen. The touch panel 1071 may include two parts: a touch detection apparatus and a touch controller. The another input device 1072 may include, but is not limited to, a physical keyboard, a function key (such as a volume control key or a switch key), a track ball, a mouse, and a joystick. Details are not described herein again.

In embodiments of this application, the radio frequency unit 101 is configured to receive downlink data from a network side device and transmit the downlink data to the processor 110 for processing; and send uplink data to the network side device. Generally, the radio frequency unit 101 includes, but is not limited to, an antenna, at least one amplifier, a transceiver, a coupler, a low noise amplifier, a duplexer, and the like.

The memory 109 may be configured to store software programs or instructions and various pieces of data. The memory 109 may mainly include a storage program or an instruction area and a storage data area. The storage program or instruction area may store an operating system, an application program or instruction required by at least one function (for example, a sound playback function and an image display function), and the like. In addition, the memory 109 may include a high-speed random access memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. For example, at least one magnetic disk storage device, a flash memory, or another non-volatile solid-state storage device.

The processor 110 may include one or more processing units. Optionally, the processor 110 may integrate an application processor and a modem processor. The application processor mainly processes an operating system, a user interface, an application program or instructions, and the like. The modem processor mainly processes wireless communication, such as a baseband processor. It may be understood that the foregoing modem processor may either not be integrated into the processor 110.

The processor 110 is configured to obtain a configuration of a target search space set, and perform PDCCH blind decoding based on the configuration of the target search space set. The target search space set meets a target condition. The target condition includes that a candidate PDCCH in the target search space set is not decoded when a decoding object corresponding to the candidate PDCCH in at least one transmission time unit exceeds a blind decoding capability of a UE, and the decoding object includes a CCE or a quantity of BD of candidate control channels.

Optionally, in embodiments of this application, the target condition further includes that a CCE index corresponding to the target search space set is group-common.

Optionally, in embodiments of this application, the target search space set is a common search space set.

Optionally, in embodiments of this application, the common search space set meets at least one of the following:

the common search space set is configured with a target parameter; and the common search space set is configured by a network side device through a target IE.

Optionally, in embodiments of this application, in a case that the common search space set is only associated with a target DCI format and/or a target RNTI, the common search space set meets the target condition.

Optionally, in embodiments of this application, the foregoing target DCI format is for scheduling a DCI format of a group-common PDSCH. Alternatively, the foregoing target RNTI meets at least one of the following: an RNTI used by the group-common PDSCH, and an RNTI used by a group-common PDCCH for scheduling the group-common PDSCH.

Optionally, in embodiments of this application, the foregoing processor 110 is further configured to:

determine whether to decode the candidate PDCCH in the target search space set based on target priority information of the target search space set, wherein the target priority information is used to characterize a sequence in which the target search space set is not decoded relative to other search space sets; the target priority information is determined based on priority configuration information or set identification information of the target search space set and a predetermined rule when the decoding object corresponding to the candidate PDCCH in the at least one transmission time unit exceeds the blind decoding capability of the UE.

Optionally, in embodiments of this application, the set identification information includes a set identification value of the target search space set. The predetermined rule includes at least one of the following:

prioritizing skipping decoding a candidate PDCCH in a search space set with a large set identification value; and prioritizing skipping decoding a candidate PDCCH in a search space set with a set priority lower than that of the target search space set.

In the terminal provided in embodiments of this application, perform blind decoding based on a configuration of a target search space set that may enable BD/CCE overbooking and that is configured by the network side device for the terminal (i.e., the candidate PDCCH in the target search space set is not decoded when the decoding object corresponding to the candidate PDCCH in the at least one transmission time unit exceeds the blind decoding capability of the terminal), to meet a service requirement of an actual system, and improve effectiveness of a communication system.

Embodiments of this application further provide a network side device. The network side device includes a processor and a communication interface, where the processor is configured to configure a target search space set for a UE; the target search space set meets a target condition; the target condition includes that a candidate PDCCH in the target search space set is not decoded when a decoding object corresponding to the candidate PDCCH in at least one transmission time unit exceeds a blind decoding capability of the UE; and the decoding object includes a CCE or a quantity of BD of candidate control channels. The network side device embodiment corresponds to the foregoing network side device method embodiment, and the implementation processes and methods of the foregoing method embodiment may be applied to the network side device embodiment, and may achieve a same technical effect.

Figure 7:
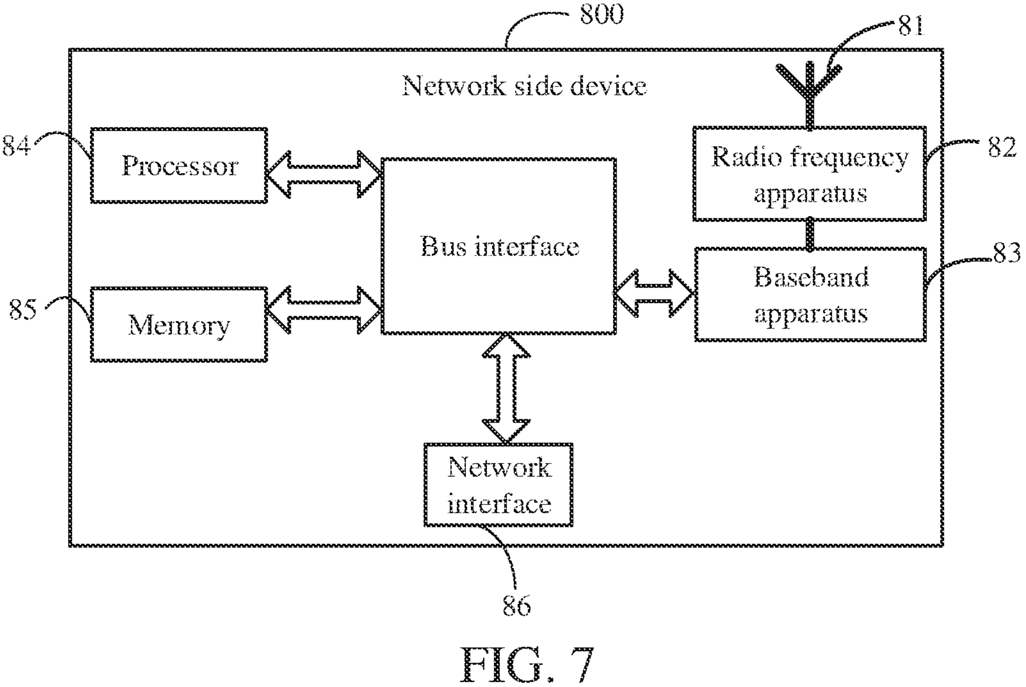
FIG. 7 is a schematic structural diagram of hardware of a network side device according to an embodiment of this application.

Optionally, embodiments of this application further provide a network side device. As shown in FIG. 7, the network side device 800 includes: an antenna 81, a radio frequency apparatus 82, and a baseband apparatus 83. The antenna 81 is connected to the radio frequency apparatus 82. In the uplink direction, the radio frequency apparatus 82 receives information through the antenna 81, and sends the received information to the baseband apparatus 83 for processing. In the downlink direction, the baseband apparatus 83 processes the information to be sent, and sends it to the radio frequency apparatus 82. The radio frequency apparatus 82 processes the received information and sends it out through the antenna 81.

The foregoing frequency band processing apparatus can be located in the baseband apparatus 83, and the method performed by the network side device in the above embodiment can be implemented in the baseband apparatus 83. The baseband apparatus 83 includes a processor 84 and a memory 85.

The baseband apparatus 83 may include, for example, at least one baseband board, which is provided with a plurality of chips, as shown in FIG. 7. One chip of the plurality of chips, for example, is the processor 84, connected to the memory 85, to call a program in the memory 85 and perform the operations of the network side device shown in the above method embodiment.

The baseband apparatus 83 may also include a network interface 86 for exchanging information with the radio frequency apparatus 82, such as a common public radio interface (CPRI).

Optionally, the network side device of embodiments of this application also includes an instruction or program stored in the memory 85 and executable on the processor 84. The processor 84 calls the instruction or program in the memory 85 to perform the method performed by the modules shown in FIG. 4, and achieves a same technical effect. To avoid repetition, details are not described herein again.

Embodiments of this application further provide a non-transitory readable storage medium, storing a program or instruction, the program or instruction, when executed by a processor, implementing the processes of the PDCCH blind decoding method embodiments and achieving a same technical effect. To avoid repetition, details are not described herein again.

The processor is a processor in the terminal described in the foregoing embodiment. The non-transitory readable storage medium includes a non-transitory computer-readable storage medium, such as a computer read-only memory (ROM), a random access memory (RAM), a magnetic disk or an optical disc.

Embodiments of this application further provide a chip. The chip includes a processor and a communication interface. The communication interface is coupled to the processor. The processor is configured to run a program or instruction to implement the processes of the method embodiments of the PDCCH blind decoding method, and achieve a same technical effect. To avoid repetition, details are not described herein again.

It should be understood that the chip mentioned in embodiments of this application may also be referred to as a system level chip, system chip, chip system, or system on chip, and the like.

It should be noted that the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one . . . " does not exclude that there are still other same elements in the processes, methods, objects, or apparatuses. In addition, it should be noted that the scope of the methods and apparatuses in embodiments of this application is not limited to performing functions in the order shown or discussed, but may also include performing functions in a substantially simultaneous manner or in the opposite order based on the involved functions. For example, the described methods may be performed in a different order from the described one, and various steps may also be added, omitted, or combined. Moreover, features described with reference to certain examples can be combined in other examples.

Through the descriptions of the foregoing implementations, a person skilled in the art may clearly understand that the method according to the foregoing embodiments may be implemented by means of software and a necessary general hardware platform, and certainly, may alternatively be implemented by hardware, but in many cases, the former manner is a better implementation. Based on such an understanding, the technical solutions of this application essentially or the part contributing to the prior art may be implemented in a form of a software product. The computer software product is stored in a non-transitory storage medium (such as a ROM/RAM, a magnetic disk, or an optical disc) and includes several instructions for instructing a terminal (which may be a mobile phone, a computer, a server, an air conditioner, a network side device, or the like) to perform the methods described in the embodiments of this application.

The embodiments of this application have been described above with reference to the accompanying drawings. This application is not limited to the embodiments described above, and the embodiments described above are merely exemplary and not limitative. Those of ordinary skill in the art may make various variations under the teaching of this application without departing from the spirit of this application and the protection scope of the claims, and such variations shall all fall within the protection scope of this application.

What is claimed is:

1. A PDCCH blind decoding method, comprising:

obtaining, by a user equipment (UE), a configuration of a target search space set; and performing, by the UE, physical downlink control channel (PDCCH) blind decoding based on the configuration of the target search space set, wherein the target search space set meets a target condition;

the target condition comprises that a candidate PDCCH in the target search space set is not decoded when a decoding object corresponding to a candidate PDCCH in at least one transmission time unit exceeds a blind decoding capability of the UE; and the decoding object comprises a control channel element (CCE) or a quantity of blind decoding (BD) of candidate control channels;

wherein the target search space set is a common search space set.

2. The method according to claim 1, wherein the target condition further comprises that a CCE index corresponding to the target search space set is group-common.

3. The method according to claim 1, wherein the common search space set meets at least one of following:

the common search space set is configured with a target parameter; or the common search space set is configured by a network side device through a target information element (IE).

4. The method according to claim 1, wherein in a case that the common search space set is only associated with a target downlink control information (DCI) format and/or a target wireless network temporary identifier (RNTI), the common search space set meets the target condition.

5. The method according to claim 4, wherein the target DCI format is for scheduling a DCI format of a group-common physical downlink shared channel (PDSCH); or the target RNTI meets one of following: an RNTI used by the group-common PDSCH, and an RNTI used by a group-common PDCCH for scheduling the group-common PDSCH.

6. The method according to claim 1, wherein the performing, by the UE, PDCCH blind decoding based on the configuration of the target search space set comprises:

determining, by the UE, whether to decode the candidate PDCCH in the target search space set based on target priority information of the target search space set, wherein the target priority information is used to characterize a sequence in which the target search space set is not decoded relative to other search space sets; and the target priority information is determined based on priority configuration information or set identification information of the target search space set and a predetermined rule when the decoding object corresponding to the candidate PDCCH in the at least one transmission time unit exceeds the blind decoding capability of the UE.

7. The method according to claim 6, wherein the set identification information comprises: a set identification value of the target search space set; and the predetermined rule comprises at least one of following:

prioritizing skipping decoding a candidate PDCCH in a search space set with a large set identification value; or prioritizing skipping decoding a candidate PDCCH in a search space set with a set priority lower than that of the target search space set.

8. A PDCCH blind decoding method, comprising:

configuring, by a network side device, a target search space set for a user equipment (UE), wherein the target search space set meets a target condition;

the target condition comprises that a candidate physical downlink control channel (PDCCH) in the target search space set is not decoded when a decoding object corresponding to a candidate PDCCH in at least one transmission time unit exceeds a blind decoding capability of the UE; and the decoding object comprises a control channel element (CCE) or a quantity of blind decoding (BD) of candidate control channels;

wherein the target search space set is a common search space set.

9. The method according to claim 8, wherein the configuring, by the network side device, the target search space set for the UE comprises:

configuring, by the network side device, a target parameter for the common search space set through a high-level parameter, wherein the common search space set configured with the target parameter meets the target condition; or configuring, by the network side device, the common search space set through a target information element (IE), wherein a configured common search space set meets the target condition.

10. A network side device, comprising a processor, a memory, and a program or instruction stored in the memory and executable on the processor, the program or instruction, when executed by the processor, implementing steps of the PDCCH blind decoding method according to claim 8.

11. A network side device, comprising a processor, a memory, and a program or instruction stored in the memory and executable on the processor, the program or instruction, when executed by the processor, implementing steps of the PDCCH blind decoding method according to claim 10.

12. The method according to claim 8, wherein the common search space set meets at least one of following:

the common search space set is configured with a target parameter; or the common search space set is configured by the network side device through a target information element (IE).

13. The method according to claim 8, wherein in a case that the common search space set is only associated with a target downlink control information (DCI) format and/or a target wireless network temporary identifier (RNTI), the common search space set meets the target condition.

14. A UE, comprising a processor, a memory, and a program or instruction stored in the memory and executable on the processor, wherein the program or instruction, when executed by the processor, causes the user equipment (UE) to perform:

obtaining a configuration of a target search space set; and performing physical downlink control channel (PDCCH) blind decoding based on the configuration of the target search space set, wherein the target search space set meets a target condition;

the target condition comprises that a candidate PDCCH in the target search space set is not decoded when a decoding object corresponding to a candidate PDCCH in at least one transmission time unit exceeds a blind decoding capability of the UE; and the decoding object comprises a control channel element (CCE) or a quantity of blind decoding (BD) of candidate control channels;

wherein the target search space set is a common search space set.

15. The UE according to claim 14, wherein the target condition further comprises that a CCE index corresponding to the target search space set is group-common.

16. The UE according to claim 14, wherein the common search space set meets at least one of following:

the common search space set is configured with a target parameter; or the common search space set is configured by a network side device through a target information element (IE).

17. The UE according to claim 14, wherein in a case that the common search space set is only associated with a target downlink control information (DCI) format and/or a target wireless network temporary identifier (RNTI), the common search space set meets the target condition.

18. The UE according to claim 17, wherein the target DCI format is for scheduling a DCI format of a group-common physical downlink shared channel (PDSCH); or the target RNTI meets one of following: an RNTI used by the group-common PDSCH, and an RNTI used by a group-common PDCCH for scheduling the group-common PDSCH.

19. The UE according to claim 14, wherein the program or instruction, when executed by the processor, causes the UE to perform:

determining whether to decode the candidate PDCCH in the target search space set based on target priority information of the target search space set, wherein the target priority information is used to characterize a sequence in which the target search space set is not decoded relative to other search space sets; and the target priority information is determined based on priority configuration information or set identification information of the target search space set and a predetermined rule when the decoding object corresponding to the candidate PDCCH in the at least one transmission time unit exceeds the blind decoding capability of the UE.

20. The UE according to claim 19, wherein the set identification information comprises: a set identification value of the target search space set; and the predetermined rule comprises at least one of following:

prioritizing skipping decoding a candidate PDCCH in a search space set with a large set identification value; or prioritizing skipping decoding a candidate PDCCH in a search space set with a set priority lower than that of the target search space set.

* * * * *